United States Patent
Iijima et al.

(10) Patent No.: US 10,831,143 B2
(45) Date of Patent: Nov. 10, 2020

(54) IMAGE FORMING APPARATUS HAVING RECORDING MEDIUM POSITIONING PORTION AND CONTROL OF TRANSPORT SPEED

(71) Applicant: FUJI XEROX CO., LTD., Tokyo (JP)

(72) Inventors: Chihiro Iijima, Kanagawa (JP); Motohiro Tokairin, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/521,962

(22) Filed: Jul. 25, 2019

(65) Prior Publication Data
US 2020/0292971 A1 Sep. 17, 2020

(30) Foreign Application Priority Data
Mar. 15, 2019 (JP) .................................. 2019-048801

(51) Int. Cl.
G03G 15/00 (2006.01)

(52) U.S. Cl.
CPC ..... *G03G 15/6564* (2013.01); *G03G 15/6594* (2013.01); *G03G 2215/00409* (2013.01); *G03G 2215/00599* (2013.01)

(58) Field of Classification Search
CPC .......... G03G 15/5029; G03G 15/6564; G03G 15/6594; G03G 2215/00409; G03G 2215/00476; G03G 2215/00481; G03G 2215/00485; G03G 2215/00599; G03G 2215/00738; G03G 2215/00746; G03G 2215/00945

USPC ........................................... 399/45, 389, 396
See application file for complete search history.

(56) References Cited

U.S. PATENT DOCUMENTS

| 4,541,711 A * | 9/1985 | Takahashi .......... G03G 15/6529 347/153 |
| 6,301,451 B1 | 10/2001 | Ando et al. |
| 7,315,701 B2 * | 1/2008 | Soures .............. G03G 15/1695 399/16 |
| 2007/0041762 A1 | 2/2007 | Ishida et al. |
| 2009/0026689 A1 * | 1/2009 | Noguchi ............. G03G 15/657 271/8.1 |

(Continued)

FOREIGN PATENT DOCUMENTS

| JP | 04075947 A * | 3/1992 |
| JP | 3632738 B2 | 3/2005 |

(Continued)

*Primary Examiner* — Robert B Beatty
(74) *Attorney, Agent, or Firm* — Sughrue Mion, PLLC (57) ABSTRACT

Provided is an image forming apparatus including a positioning portion provided upstream of a transfer portion in a transport direction of a recording medium. The positioning portion positions the medium using a leading end of the medium. Additionally included is a detector that is disposed downstream of the positioning portion in the transport direction, and that detects passage of the leading end of the medium; and a controller that controls a transport speed in a period from when the leading end of the medium passes through the detector to when the leading end of the medium passes through a target position situated downstream of the detector in the transport direction, in accordance with a time since transport of the medium is started from the positioning portion until the leading end of the medium passes through the detector.

6 Claims, 7 Drawing Sheets

(56) References Cited

U.S. PATENT DOCUMENTS

| | | | |
|---|---|---|---|
| 2010/0135681 A1* | 6/2010 | Yanagi | G03G 15/6564 399/45 |
| 2011/0076035 A1* | 3/2011 | Iwakawa | G03G 15/6558 399/16 |
| 2013/0161900 A1* | 6/2013 | Takahashi | G03G 15/0189 271/228 |
| 2015/0307302 A1* | 10/2015 | Miyamoto | G03G 15/6564 271/3.16 |
| 2019/0018359 A1* | 1/2019 | Sugiyama | G03G 15/6564 |

FOREIGN PATENT DOCUMENTS

| | | | |
|---|---|---|---|
| JP | 2006248644 A | * | 9/2006 |
| JP | 2007-86726 A | | 4/2007 |
| JP | 2007223728 A | * | 9/2007 |
| JP | 2008-133111 A | | 6/2008 |

\* cited by examiner

FIG. 7

IMAGE FORMING APPARATUS HAVING RECORDING MEDIUM POSITIONING PORTION AND CONTROL OF TRANSPORT SPEED

CROSS-REFERENCE TO RELATED APPLICATIONS

This application is based on and claims priority under 35 USC 119 from Japanese Patent Application No. 2019-048801 filed Mar. 15, 2019.

BACKGROUND

(i) Technical Field

The present disclosure relates to an image forming apparatus.

(ii) Related Art

Japanese Patent Application Publication No. 2008-133111 discloses a sheet transport apparatus including a transport unit that transports a sheet and a controller that controls the transport speed of the transport unit. A speed-change control point is provided in the middle of a sheet transport path. The controller sets the transport speed of the transport unit to a first setting speed on the upstream side of the speed-change control point; obtains correlation between the first setting speed and the actual transport speed; and changes the speed of the transport unit after the sheet passes through the speed-change control point to a second setting speed based on the correlation.

SUMMARY

Aspects of non-limiting embodiments of the present disclosure relate to obtaining an image forming apparatus capable of increasing the precision of the timing at which a medium is transported to a transfer portion as compared with a configuration in which the change point of the transport speed is provided at only one position in a period from when transport of the medium is started to when the medium is transported to the transfer portion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a positioning portion that is provided upstream of a transfer portion in a transport direction of a medium which is an image formation object, and that positions the medium by bringing a leading end of the medium into contact with the positioning portion; a driving source that provides a driving force to transport the medium positioned at the positioning portion; a detector that is disposed downstream of the positioning portion in the transport direction, and that detects passage of the leading end of the medium; and a controller that controls a transport speed in a period from when the leading end of the medium passes through the detector to when the leading end of the medium passes through a target position situated downstream of the detector in the transport direction, in accordance with a time since transport of the medium is started from the positioning portion until the leading end of the medium passes through the detector, so as to decrease a variation in the time since the transport of the medium is started by the driving source until the leading end of the medium passes through the target position and so as to decrease a speed difference between the transport speed of the medium and a driving speed in the transfer portion in a period from when the leading end of the medium passes through the target position until when the leading end of the medium enters the transfer portion.

BRIEF DESCRIPTION OF THE DRAWINGS

Exemplary embodiments of the present disclosure will be described in detail based on the following figures, wherein.

DETAILED DESCRIPTION

Figure 1:
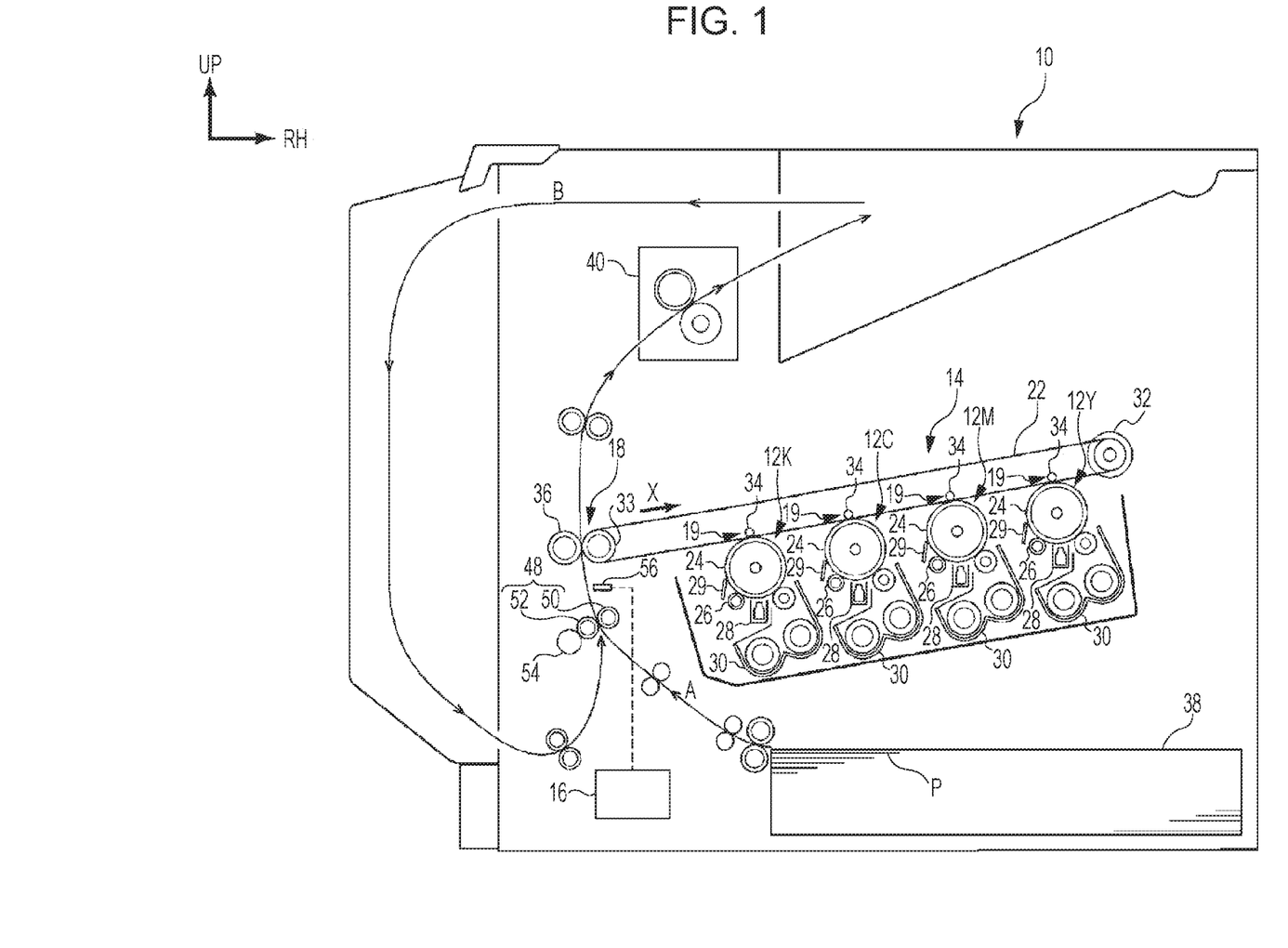
FIG. 1 is a front view schematically illustrating the inner structure of an image forming apparatus according to a first exemplary embodiment.

An example of an image forming apparatus (occasionally merely referred to as "apparatus") according to an exemplary embodiment of the disclosure is described with reference to FIGS. 1 to 7. Arrow UP in FIG. 1 indicates the vertical direction and the apparatus up direction. As illustrated in FIG. 1, arrow RH is the horizontal direction and the right side when a viewer faces the apparatus 10. As illustrated in FIG. 1, arrow FR is the horizontal direction and the near side when the viewer faces the apparatus 10. Moreover, when the up-down direction is designated in the description given below without noted, the up-down direction represents the up or down direction of the apparatus 10 illustrated in FIG. 1. When the left-right direction is designated in the description given below without noted, the left-right direction represents the left or right (=RH) direction when the viewer faces the apparatus illustrated in FIG. 1. When the depth direction is designated in the description given below without noted, the depth direction represents the near side or far side in the depth direction when the viewer faces the apparatus 10 illustrated in FIG. 1.

First Exemplary Embodiment

The apparatus 10 according to the first exemplary embodiment is now described with reference to FIGS. 1 to 5.

General Configuration of Image Forming Apparatus 10

A configuration of the image forming apparatus 10 is now described. FIG. 1 is a front view schematically illustrating the image forming apparatus 10 according to this exemplary embodiment.

As illustrated in FIG. 1, the image forming apparatus 10 includes an image forming unit 12 that forms an image by electrophotographic system, an intermediate transfer belt 22 that holds the formed image, and an intermediate transfer unit 14 that holds the intermediate transfer belt 22. In addition, a second transfer roller 36 that transfers the image from the intermediate transfer unit 14 to a sheet P for image recording (corresponding to an example of a medium of an image formation object) is provided on the left side of the intermediate transfer unit 14.

A contact portion of the intermediate transfer belt 22 and the second transfer roller 36 defines a second transfer portion 18 (described later). At this second transfer portion 18, a toner image, which is formed by the image forming unit 12, is transferred to a surface of a sheet P via the intermediate transfer belt 22.

The image forming apparatus 10 includes plural image forming units 12 that form toner layers of respective colors. In this exemplary embodiment, four image forming units 12 including an yellow image forming unit 12Y, a magenta image forming unit 12M, a cyan image forming unit 12C, and a black image forming unit 12K are provided.

In this exemplary embodiment, yellow (=Y), magenta (=M), cyan (=C), and black (=K) are basic colors to output a color image. In the following description, when the respective colors of the image forming units 12Y, 12M, 12C, and 12K do not have to be distinguished from one another, the image forming units 12Y, 12M, 12C, and 12K are merely referred to as "image forming units 12" and the image forming units 12 are described while the individual signs Y, M, C, and K indicating the image forming units of the respective colors are omitted.

The image forming units 12 of the respective colors are configured similarly to one another except for the toner to be used. As illustrated in FIG. 1, each image forming unit 12 includes a rotatable cylindrical photoreceptor 24, and a charging portion 26 that electrically charges the photoreceptor 24. In addition, the image forming unit 12 includes an exposure device 28 that forms an electrostatic latent image by irradiating the charged photoreceptor 24 with light for exposure, and a developing device 30 that develops the electrostatic latent image by using a developer including a toner, as an image formed by using a toner layer. Further, each image forming unit 12 includes a cleaning blade 29 that cleans a remaining toner remaining on the photoreceptor 24 after the toner layer is transferred to the intermediate transfer belt 22.

Each photoreceptor 24 is able to contact the intermediate transfer belt 22. In addition, as illustrated in FIG. 1, the respective image forming units 12 corresponding to yellow, magenta, cyan, and black are disposed side by side from the upstream side in a circulation direction of the intermediate transfer belt 22 (=a direction indicated by arrow X in FIG. 1, hereinafter, referred to as arrow X direction).

Intermediate Transfer Unit 14

The intermediate transfer unit 14 includes a first transfer roller 34 disposed to face the image forming unit 12 of the corresponding color, and a backup roller 33 disposed to face the second transfer roller 36.

Intermediate Transfer Belt 22

As illustrated in FIG. 1, the intermediate transfer belt 22 has an endless form. In addition, the intermediate transfer belt 22 is wound around plural rollers 32 and hence the posture thereof is determined. In this exemplary embodiment, the posture of the intermediate transfer belt 22 is determined to have an elliptic shape long in the apparatus width direction in front view. The roller on the right end side among the plural rollers 32 has a function of rotating the intermediate transfer belt 22 in the arrow X direction with power of a motor (not illustrated). The intermediate transfer belt 22 transports an image obtained by first transfer to a second transfer portion 18 (described later) by being rotated in the arrow X direction.

The intermediate transfer belt 22 is able to circulate in the arrow X direction in a state in which the intermediate transfer belt 22 is in contact with or separated from the photoreceptor 24 of each color.

First Transfer Portion

As illustrated in FIG. 1, a first transfer portion 19, which is provided for each color, is defined by a contact portion of the photoreceptor 24 and the intermediate transfer belt 22. The intermediate transfer belt 22 is in contact with the photoreceptor 24 with a predetermined load by the first transfer roller 34 disposed to face the photoreceptor 24 at each first transfer portion.

In addition, a feeding portion (not illustrated) applies a voltage to the first transfer roller 34. The voltage is a first transfer voltage to first transfer a toner image formed on the photoreceptor 24 to the intermediate transfer belt 22 at a position between the photoreceptor 24 and the first transfer roller 34.

Second Transfer Portion

As illustrated in FIG. 1, a second transfer portion 18 (=corresponding to an example of a transfer portion) is defined by a contact portion of the intermediate transfer belt 22 and the second transfer roller 36 formed in a roller shape. The intermediate transfer belt 22 contacts the second transfer roller 36 with a predetermined load by the backup roller 33 disposed to face the second transfer roller 36.

A feeding portion (not illustrated) applies a voltage to the second transfer roller 36. The voltage is a second transfer voltage used when toner images transferred to the intermediate transfer belt 22 in a superposed manner are second transferred to a sheet P transported to the second transfer portion 18.

Fixing Unit

A fixing unit 40 is disposed downstream of the second transfer portion 18 in a transport direction of a sheet P. The fixing unit 40 includes a pair of rollers facing each other. The pair of rollers face each other with a transport path A interposed therebetween. That is, a sheet P serving as a fixing object is transported to pass through a position between the pair of rollers.

Sheet Transport Path

The sheet transport path A illustrated in FIG. 1 (hereinafter, merely referred to as "transport path A") indicates a path through which a sheet P prepared in advance in a sheet tray 38 is transported. To be specific, the transport path A includes plural sheet transport rollers (not illustrated). Thus, the sheet P is transported along the transport path A to pass through the second transfer portion 18 and the fixing unit 40 in that order.

In addition, a sheet transport path B illustrated in FIG. 1 (hereinafter, merely referred to as "transport path B") indicates a path through which a sheet P, which has passed through the fixing unit 40, is transported to a portion of the transport path A again. Specifically, the sheet P, which has passed through the transport path A, is front-back inverted from the situation in which the sheet P is transported through the transport path A before passing through the fixing unit 40. Then the sheet P is returned to the transport path A.

Image Forming Operation

A basic image forming operation by the image forming apparatus 10 is now briefly described.

As illustrated in FIG. 1, the image forming apparatus 10 includes a controller 16 (which will be described later in detail). When receiving an image formation command from the outside, the controller 16 activates each image forming unit 12. The photoreceptor 24 of each color is electrically charged by the charging portion 26 while rotating. In addition, the controller 16 transmits image data on which image processing has been provided by an image signal processor (not illustrated) to each exposure device 28. Each exposure device 28 irradiates the corresponding photoreceptor 24 with exposure light in accordance with the image data and hence exposes the charged photoreceptor 24 to the light. Thus, an electrostatic latent image is formed on the outer peripheral surface of each photoreceptor 24. The electrostatic latent image formed on each photoreceptor 24 is developed by the corresponding developing device 30, and a toner image of the corresponding color is formed on the photoreceptor 24 of the corresponding color.

The toner image of each color formed on the photoreceptor 24 of the corresponding color is first transferred to the intermediate transfer belt 22 by the first transfer roller 34 of the corresponding color at the corresponding first transfer portion. At this time, the toner images of the respective colors are sequentially first transferred to the intermediate transfer belt 22 in a manner superposed on one another while the intermediate transfer belt 22 circulates. The superposed toner image is transported to the second transfer portion by circulation of the intermediate transfer belt 22. The superposed toner image is transferred from the intermediate transfer belt 22 to a sheet P at the second transfer portion.

The sheet P to which the toner image has been second transferred is transported to the fixing unit 40. In the fixing unit 40, the sheet P is heated and pressed by a pair of fixing rollers. Thus, the toner image formed by the respective image forming units 12 is fixed to the sheet P.

When images are formed on both surfaces of a sheet P, the sheet P which has passed through the fixing unit 40 is front-back inverted in the following transport path. Then, the sheet P is transported along the transport path B including plural rollers (not illustrated), and is transported to a portion of the transport path A again.

Configuration of Feature Portions

Configurations of feature portions of this exemplary embodiment are described below.

Positioning Portion 48

A positioning portion 48 includes an upper roller 50 and a lower roller 52. The upper roller 50 and the lower roller 52 are provided to face each other in a contact manner. The contact point of the upper roller 50 and the lower roller 52 defines a portion of the transport path A. That is, the transport path A is configured such that a sheet P passes through a position between the upper roller 50 and the lower roller 52. The upper roller 50 and the lower roller 52 also serve as transport rollers for sheet transport, and are rotated by a driving force supplied by a driving source 54 (which will be described later in detail).

Figure 2:
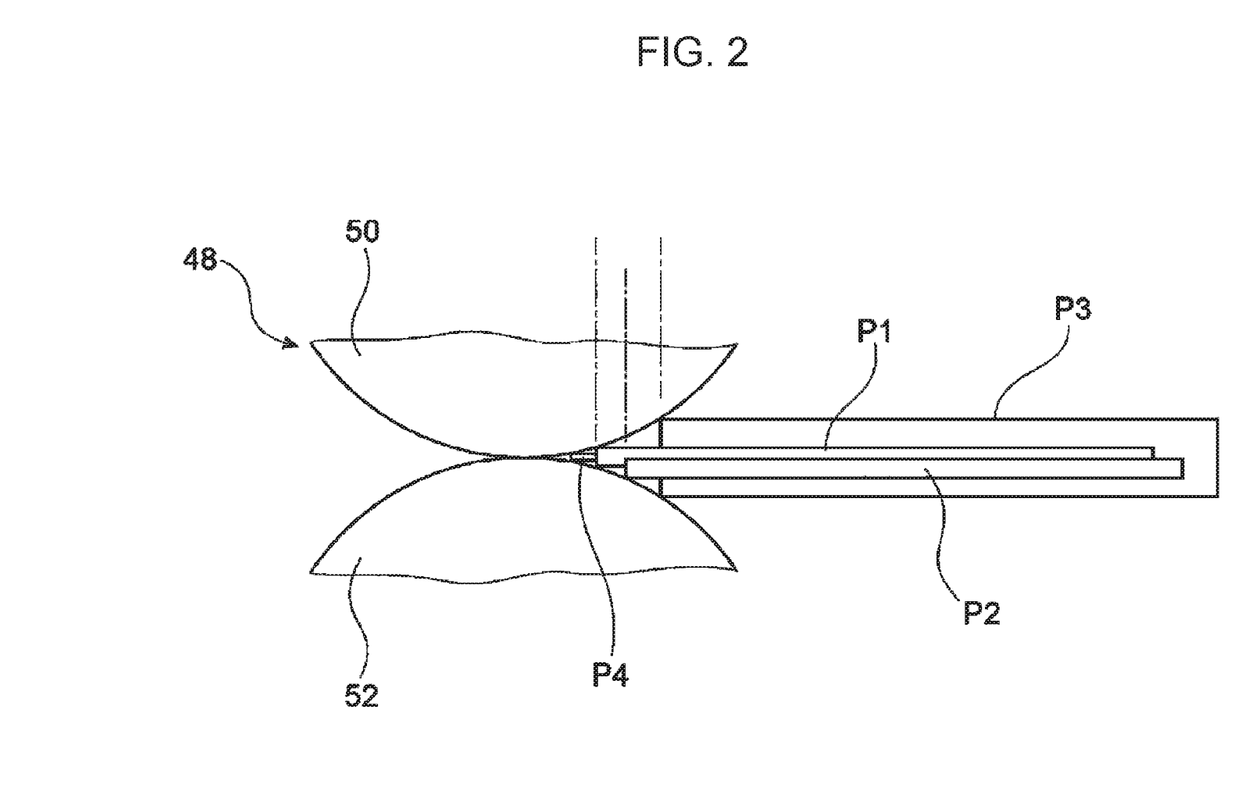
FIG. 2 is an enlarged view illustrating in an enlarged manner a positioning portion of the image forming apparatus illustrated in FIG. 1.

As illustrated in FIG. 2, the leading end of a sheet P is brought into contact with the upper roller 50 and the lower roller 52, and hence the sheet P is positioned. At this time, the upper roller 50 and the lower roller 52 are stopped. The transport of the positioned sheet P is started at a desirable timing in response to an instruction of the controller 16.

In this case, a sheet P1 represents a sheet in a state in which a leading end portion thereof is brought into contact with the upper roller 50 and the lower roller 52 in an ideal state. A state in which the leading end portion is brought into contact with the upper roller 50 and the lower roller 52 at a position further close to the contact point of the upper roller 50 and the lower roller 52 is an ideal state. In contrast, a sheet P2 is in a state in which the sheet P2 is brought into contact with the lower roller 52 at a position in front of the sheet P1 (that is, on the upstream side in the sheet transport direction) and is positioned.

Further, a sheet P3 is in a state in which the sheet P3, which is thicker than the sheet P1, is brought into contact with the upper roller 50 and the lower roller 52. In the case of such a thick sheet, the sheet is positioned on the further upstream side in the transport direction.

Furthermore, a sheet P4 is in a state in which the sheet P4, which is thinner than the sheet P1, is brought into contact with the upper roller 50 and the lower roller 52. In the case of such a thin sheet, the sheet is positioned on the further downstream side in the transport direction.

Driving Source 54

A driving source 54 provides driving of both the upper roller 50 and the lower roller 52, or one of the upper roller 50 and the lower roller 52. In addition, the driving source 54 provides driving of rollers that are included in rollers for sheet transport disposed in the transport path A (not illustrated) and that are disposed in the area from the positioning portion 48 to the second transfer portion 18.

Sensor 56

A sensor 56 (corresponding to an example of a detector) is disposed downstream of the positioning portion 48 in the transport direction of a sheet P in the transport path A. The sensor 56 has a function of detecting passage of the leading end of the sheet P.

Controller 16

The controller 16 has a function of controlling the positioning portion 48, the driving source 54, and the sensor 56. In this case, the controller 16 includes a central processing unit (CPU), a read only memory (ROM), a random access memory (RAM), a storage, a communication interface, and an input unit. The respective configurations are connected to one another to make communication with one another via a bus.

The CPU executes various programs and controls respective units and portions. That is, the CPU reads a program from the ROM or the storage, and executes the program while using the RAM as a work area. The CPU executes the control on the respective units and portions and executes various arithmetic operations according to a program stored in the ROM or the storage. In this exemplary embodiment, the ROM or the storage stores an information processing program.

The ROM stores various programs and various data. The RAM serves as the work area, and temporarily stores a program or data. The storage includes a hard disk drive (HDD) or a solid state drive (SSD), and stores various programs including an operating system, or various data.

The communication interface is an interface for making communication with another device such as an external server (not illustrated). For example, the communication interface is one complying with a standard, such as Ethernet (registered trademark), fiber distributed data interface (FDDI), or Wi-Fi (registered trademark).

The input unit includes a pointing device such as a mouse, or a keyboard, and is used for making various inputs.

Target Position

As illustrated in FIG. 1, the transport path A includes a target position situated downstream of the sensor 56 and upstream of the second transfer portion 18 in the transport direction of a sheet P. When the sheet P being transported through the transport path A passes through the target position, a roller (not illustrated) that is driven by the driving source 54 changes the transport speed of the sheet P. The controller 16 controls the changed transport speed to decrease the difference in speed from the transport speed of the intermediate transfer belt 22. In this case, passage of a sheet P represents that the leading end of a sheet P in the transport direction reaches the position.

Functional Configurations

Functional configurations of the apparatus 10 are now described.

Figure 3:
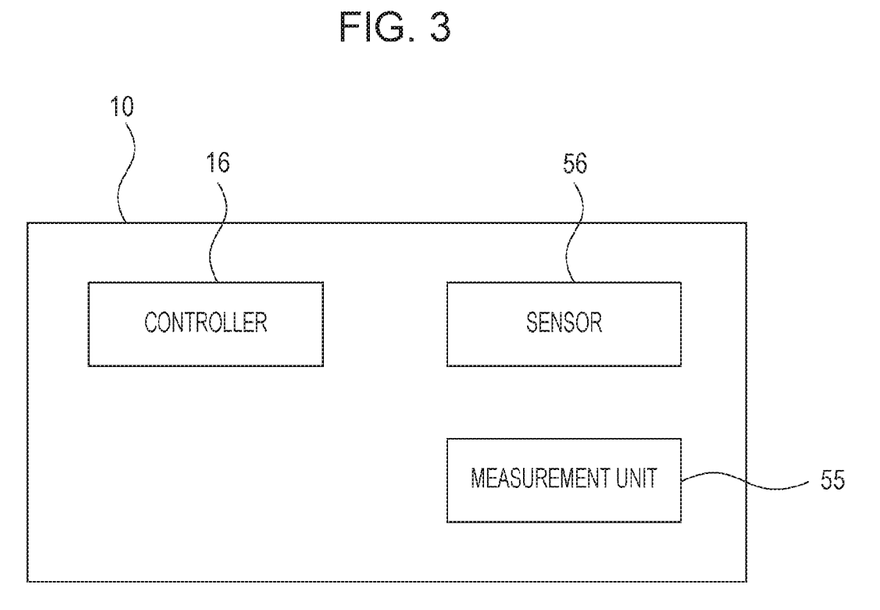
FIG. 3 is a functional block diagram illustrating portions of functional configurations of the image forming apparatus illustrated in FIG. 1.

As illustrated in FIG. 3, the apparatus 10 includes the controller 16, the sensor 56, and a measurement unit 55. Each functional configuration is realized by the CPU reading an information processing program stored in the ROM or the storage, developing the program in the RAM, and executes the program.

The sensor 56 detects passage of the leading end of a sheet P. The measurement unit 55 measures the driving amount of the driving source 54. The controller 16 controls, via the driving source 54, the timing and speed at which the sheet P is transported in accordance with the information acquired by the sensor 56 and the measurement unit 55.

Operations and Advantages

Operations and advantages of this exemplary embodiment are described below.

Figure 4:
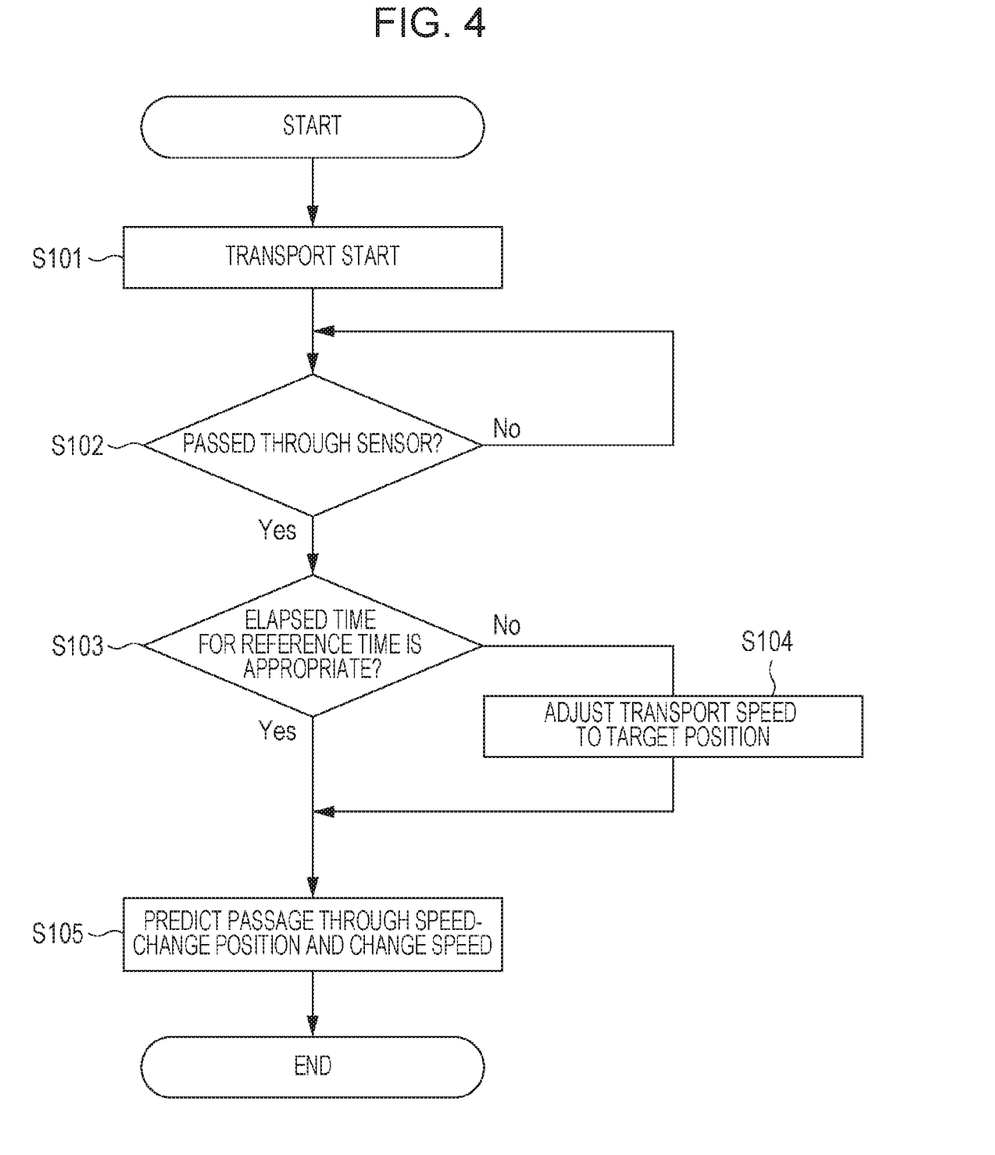
FIG. 4 is a flowchart illustrating the flow of processes by a controller of the image forming apparatus illustrated in FIG. 1.

FIG. 4 is a flowchart illustrating the flow of processes by the controller 16 according to the first exemplary embodiment. In this exemplary embodiment, processes are performed by the CPU reading the information processing program stored in the ROM or the storage, developing the program in the RAM, and executing the program.

The processes illustrated in FIG. 4 are started when a print operation of the apparatus 10 is started and then when the leading end of a sheet P is positioned by the positioning portion 48.

In step S101, the CPU operates as the controller 16 and starts transport of a sheet. In step S102, it is determined whether or not a sheet P has passed through the sensor 56. When a sheet P has not passed through the sensor 56 yet (step S102: No), the CPU waits until a sheet P passes through the sensor 56. In contrast, when a sheet P has passed through the sensor 56 (step S102: Yes), the process shifts to step S103.

In step S103, the CPU determines whether or not the elapsed time since transport of the sheet P is started from the positioning portion 48 until passage through the sensor 56 is appropriate for a predetermined reference time. The reference time in this case is a predetermined time. For example, when the leading end of the sheet P is positioned in an ideal state like the state of the sheet P1 in FIG. 2, a standard time since the transport of the sheet P is started until the passage through the sensor 56 may be set as the reference time. The reference time to be set may include various times which differ from one another in accordance with the thickness of the sheet to be transported.

When the elapsed time is not appropriate (step S103: No), the CPU adjusts the transport speed in the area from the sensor 56 to the target position, so that the time since the transport of the sheet P is started from the positioning portion 48 until the passage through the target position is equivalent to that when the reference time is appropriate (step S104). In contrast, when the elapsed time is appropriate (step S103: Yes), the process shifts to step S105. Alternatively, step S103 may be omitted, and in step S104, the transport speed in the area to the target position may be adjusted regardless of the elapsed time.

In step S105, the CPU predicts the arrival timing of the sheet P being transported at the target position, and changes the transport speed of the sheet P to decrease the speed difference from the speed of the intermediate transfer belt 22. Then, the processes illustrated in FIG. 4 are ended.

Figure 5:
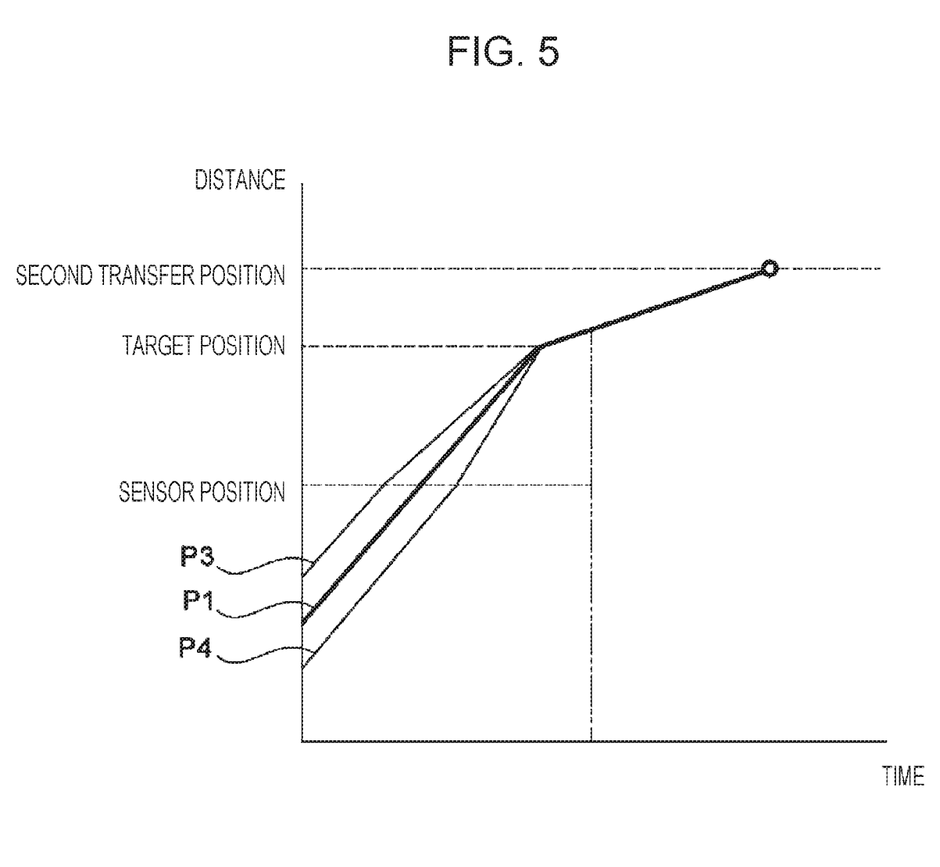
FIG. 5 is a graph illustrating the states of transport of media in the image forming apparatus illustrated in FIG. 1.

FIG. 5 illustrates the states of transport of media according to this exemplary embodiment. As illustrated in FIG. 5, when the sheet P1 positioned in the ideal state is transported, the transport speed is not changed until the speed P1 reaches the target position after passing through the sensor position. In the case of the sheet P3 positioned on the more upstream side in the transport direction than the sheet P1 (corresponding to the sheet P3 in FIG. 2), control is given such that the transport speed is increased in a period from when the sheet P3 passes through the sensor position to when the sheet P3 reaches the target position and that the sheet P3 reaches the target position at a timing equivalent to the timing at which the sheet P1 reaches the target position.

In the case of the sheet P4 positioned on the more downstream side in the transport direction than the sheet P1 (corresponding to the sheet P4 in FIG. 2), control is given such that the transport speed is decreased since the sheet P4 has passed through the sensor position until the sheet P4 reaches the target position and that the sheet P4 reaches the target position at a timing equivalent to the timing at which the sheet P1 reaches the target position.

Second Exemplary Embodiment

An apparatus 10 according to a second exemplary embodiment is now described with reference to FIGS. 1, 2, 6, and 7. The second exemplary embodiment is a modification of the first exemplary embodiment, and hence like reference signs are applied to like configurations and the description thereof is omitted.

Driving Source 54

In this exemplary embodiment, the driving source 54 illustrated in FIG. 1 is a direct-current (DC) motor. When the driving source 54 uses a stepping motor, the size and the current value for driving may increase, for example, in order to avoid loss of synchronism. Thus, as compared with the configuration employing the DC motor, the manufacturing cost and running cost may increase. In contrast, when the DC motor is employed, the size and cost may be decreased.

However, with the DC motor, a transient response may not occasionally follow an input as compared with the case employing the stepping motor.

Measurement Unit 55

In this exemplary embodiment, the driving source 54 includes a measurement unit 55. The measurement unit 55 measures the driving amount of the driving source 54. The driving amount in this case is, for example, the number of rotations of the DC motor. The controller 16 processes information on the driving amount measured by the measurement unit 55.

Operations and Advantages

Operations and advantages of this exemplary embodiment are described below.

Figure 6:
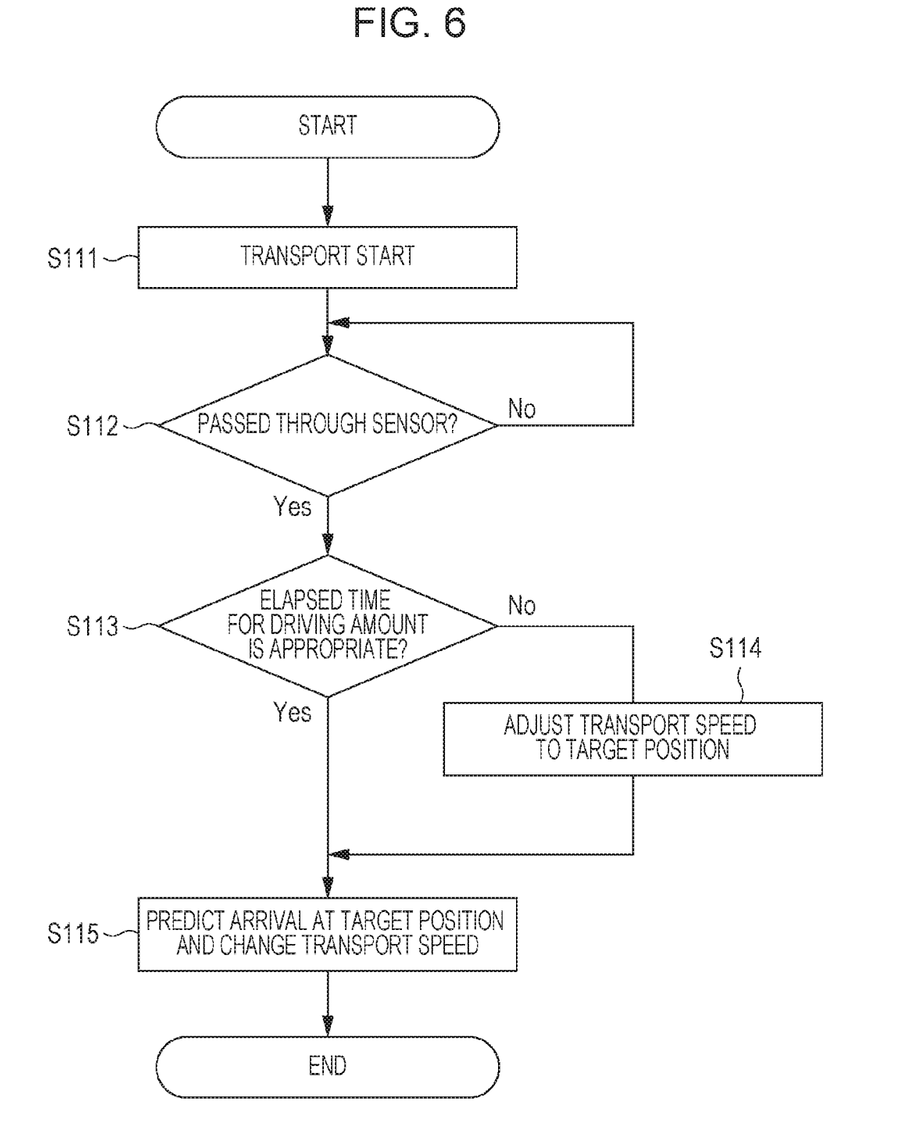
FIG. 6 is a flowchart illustrating the flow of processes by a controller according to a second exemplary embodiment.

FIG. 6 is a flowchart illustrating the flow of processes by the controller 16 according to the first exemplary embodiment. In this exemplary embodiment, processes are performed by the CPU reading the information processing program stored in the ROM or the storage, developing the program in the RAM, and executing the program.

The processes illustrated in FIG. 6 are started when a print operation of the apparatus 10 is started and then the leading end of a sheet P is positioned by the positioning portion 48.

In step S111, the CPU operates as the controller 16 and starts transport of a sheet. In step S112, it is determined whether or not a sheet P has passed through the sensor 56. When a sheet P has not passed through the sensor 56 yet (step S112: No), the CPU waits until a sheet P passes through the sensor 56. In contrast, when a sheet P has passed through the sensor 56 (step S112: Yes), the process shifts to step S113.

In step S113, the CPU determines whether or not the elapsed time since transport of the sheet P is started from the positioning portion 48 until passage through the sensor 56 is appropriate in comparison with the driving amount of the driving source 54. In this case, "whether or not being appropriate in comparison with the driving amount" represents whether or not a sheet P is transported to the second transfer portion 18 at a desirable timing, for example, when no transient response of the DC motor is made and transport is continued to a target position 58 without changing the speed.

When the elapsed time is not appropriate (step S113: No), the CPU adjusts the transport speed in the area from the sensor 56 to the target position 58, so that the time since the transport of the sheet P is started from the positioning portion 48 until the passage through the target position 58 is equivalent to that when the target time is appropriate (step S114). In contrast, when the elapsed time is appropriate (step S113: Yes), the process shifts to step S115. Alternatively, step S113 may be omitted, and in step S114, the transport speed in the area to the target position may be adjusted regardless of the elapsed time.

In step S115, the CPU predicts the arrival timing of the sheet P being transported at the target position 58, and changes the transport speed of the sheet P to decrease the speed difference from the speed of the intermediate transfer belt 22. Then, the processes illustrated in FIG. 6 are ended.

Figure 7:
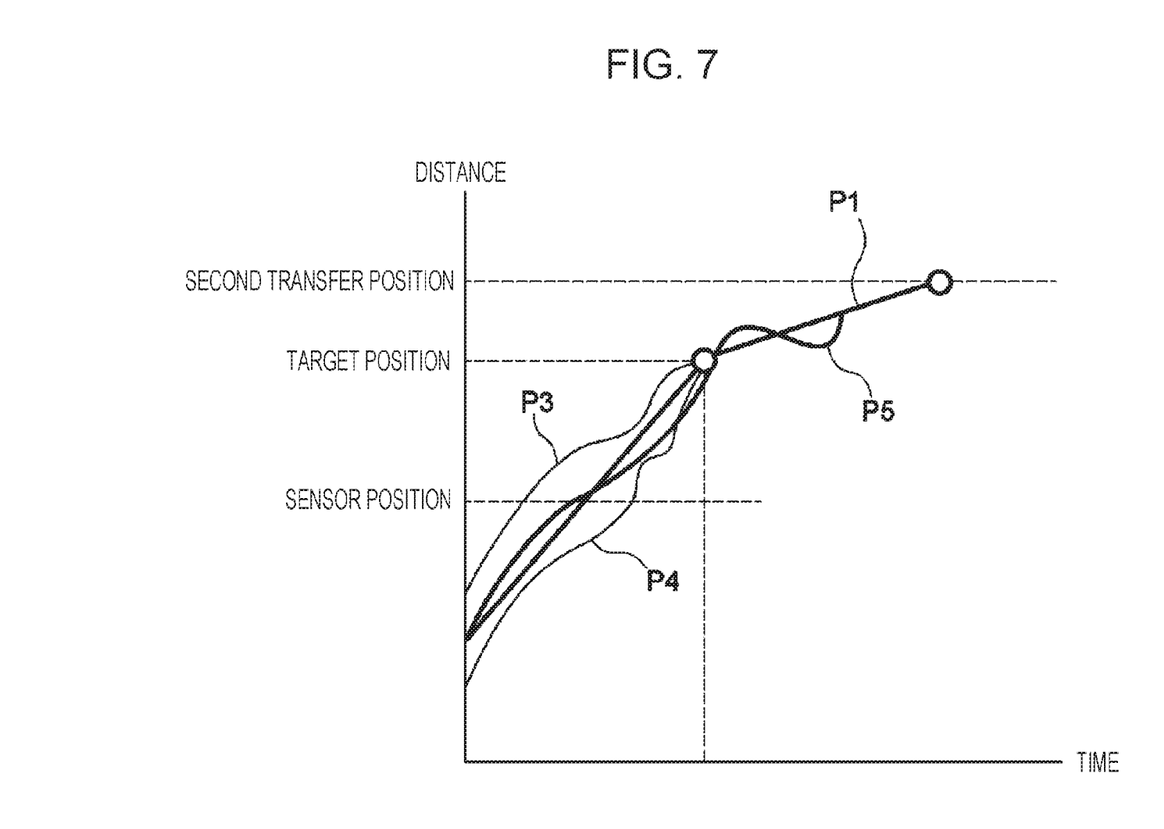
FIG. 7 is a graph illustrating the states of transport of media in an image forming apparatus illustrated in FIG. 6.

FIG. 7 illustrates the states of transport of media according to this exemplary embodiment. A line P1 indicates the relation between the ideal transport speed and the position of the sheet P1 positioned at the ideal position in FIG. 2 when the driving source 54 has no transient response. In this case, the CPU provides adjustment such that the speed of the sheet P1 is not changed before and after the passage through the sensor 56. A line P5 indicates the relation between the transport speed and the position that take into account the transient response of the DC motor in the case similar to the above. The distance from the sensor 56 to the target position and the distance from the target position to the second transfer portion 18 are set to be longer than the distance and time required for settlement of the transient response when the driving source 54 is the DC motor.

Lines P3 and P4 in FIG. 7 indicate states with variations as compared with the line P1 in terms of the elapsed time at a time point at which the sheet P is transported to the position of the sensor 56 since the transport from the positioning portion 48 is started. In the case of the sheet P3 positioned on the more upstream side in the transport direction than the sheet P1 (corresponding to the sheet P3 in FIG. 2), control is given such that the transport speed is increased in a period from when the sheet P3 passes through the sensor position to when the sheet P3 reaches the target position and that the sheet P3 reaches the target position at a timing equivalent to the timing at which the sheet P1 reaches the target position.

In the case of the sheet P4 positioned on the more downstream side in the transport direction than the sheet P1 (corresponding to the sheet P4 in FIG. 2), control is given such that the transport speed is decreased since the sheet P4 has passed through the sensor position until the sheet P4 reaches the target position and that the sheet P4 reaches the target position at a timing equivalent to the timing at which the sheet P1 reaches the target position.

Modifications

While the image forming apparatus according to each of the exemplary embodiments has been described above, various modifications may be made within the scope not departing from the gist of the disclosure.

For example, the positioning portion 48 and the sensor 56 in FIG. 1 may be provided upstream of the joint point of the transport path B and the transport path A, in the sheet transport direction in the transport path A. In this case, a configuration similar to the above may be provided upstream in the sheet transport direction in the transport path B. Thus, even when the design has limitation, the joint position of the transport path B to the transport path A may be freely determined.

In addition, application or non-application of each exemplary embodiment may be selected in accordance with a print condition input by a user. For example, the sheet transport control described in each exemplary embodiment may be performed only when "high image quality mode" of printing a high-precision image is input. Alternatively, for example, the sheet transport control described in each exemplary embodiment may be performed only for a type of sheet the position of which is likely misaligned in the transport direction during transport of the sheet.

In addition, the driving source according to the second exemplary embodiment may employ a brushless DC motor. In this case, a built-in encoder for phase detection (corresponding to an example of a detector) to control driving of the brushless DC motor may be employed as a measurement unit for measurement of the driving amount.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
   a positioning portion that is provided upstream of a transfer portion in a transport direction of a medium which is an image formation object, and that positions the medium by bringing a leading end of the medium into contact with the positioning portion;
   a driving source configured to provide a driving force to transport the medium positioned at the positioning portion;
   a detector that is disposed downstream of the positioning portion in the transport direction, and configured to detect passage of the leading end of the medium; and
   a controller configured to control a transport speed in a period from when the leading end of the medium passes through the detector to when the leading end of the medium passes through a target position situated downstream of the detector and upstream of the transfer portion in the transport direction, in accordance with a time since transport of the medium is started from the positioning portion until the leading end of the medium passes through the detector, to decrease a variation in the time since the transport of the medium is started by the driving source until the leading end of the medium passes through the target position and to decrease a speed difference between the transport speed of the medium and a driving speed in the transfer portion in a period from when the leading end of the medium passes through the target position until when the leading end of the medium enters the transfer portion.

2. The image forming apparatus according to claim 1, wherein the controller controls the transport speed of the medium in the period from when the leading end of the medium passes through the detector to when the leading end of the medium passes through the target position, in accordance with a difference of the time since the transport of the medium is started until the leading end of the medium passes through the detector with respect to a reference time since the transport of the medium is started by the driving source until the leading end of the medium passes through the detector.

3. The image forming apparatus according to claim 2, wherein the reference time is provided in accordance with a thickness of a medium to be transported, and wherein the controller uses a reference time corresponding to the thickness of the medium to be transported.

4. The image forming apparatus according to claim 1, further comprising:
a measurement unit configured to measure a driving amount of the driving source,
wherein the controller controls the transport speed of the medium in the period from when the leading end of the medium passes through the detector to when the leading end of the medium passes through the target position, in accordance with the time since the transport of the medium is started until the leading end of the medium passes through the detector, with respect to the driving amount of the driving source, measured by the measurement unit, in the period from when the transport of the medium is started to when the leading end of the medium passes through the target position.

5. The image forming apparatus according to claim 4, wherein the driving source is a direct-current motor, and wherein a transport time of the leading end of the medium from the target position to the transfer portion is set to be longer than a time required for settlement of a transient response of the direct-current motor.

6. The image forming apparatus according to claim 5, wherein the direct-current motor is a brushless motor, and wherein the measurement unit is a detector that is built-in for driving control of the brushless motor, and that detects a phase.

* * * * *